United States Patent

[15] 3,692,922

Sugimoto et al.

[45] Sept. 19, 1972

[54] CABLE JOINT WITH HIGH VOLTAGE STRESS RELIEF

[72] Inventors: Yoichi Sugimoto, Fujidera; Shizuhiro Nakata, Yamatokoriyama; Atsuo Nakashima, Ibaraki; Souzo Idomoto, Miyakojima-ku, all of Japan

[73] Assignee: Sumitomo Electric Industries, Ltd., Osaka, Japan; Yoichi Sugimato, Shizuhiro Nakata, and Atsuo Nakashima by said Idomoto

[22] Filed: April 6, 1971

[21] Appl. No.: 131,612

Related U.S. Application Data

[63] Continuation-in-part of Ser. No. 846,517, July 31, 1969, abandoned.

[52] U.S. Cl. ............... 174/73 R, 174/88 R, 174/91, 174/93
[51] Int. Cl. ........................ H02g 3/00, H02g 15/08
[58] Field of Search ........ 174/93, 91, 84 R, 88 R, 73, 174/76; 339/211, 213

[56] References Cited

UNITED STATES PATENTS 3,485,935  12/1969  Kreuger ................... 174/88 R
3,558,799  1/1971  Lee ........................ 174/73 R

*Primary Examiner*—Darrell L. Clay
*Attorney*—Sughrue, Rothwell, Mion, Zinn & Macpeak

[57] ABSTRACT

A cable joint employs premolded insulation in the form of a sleeve which is applicable irrespective of the size of the cable by making the inner diameter of the end portion of the premolded insulation sleeve equal to or larger than the diameter of the outer sheath of the cable and inserting a cylindrical spacer into a gap which is present between the inner circumference of the insulation sleeve and the outer circumference of the cable. The sleeve includes inner and outer concentric tubular portions, the inner portion being formed of electrically insulative material and the outer tubular portion of semi-conductive material, the end faces of the inner tubular portion being frustoconical and tapering away from the conductor joint. A stress cone formed on the end of each spacer acts as frustoconical extension to the outer tubular portion of the sleeve providing high voltage stress relief to the cable joint.

6 Claims, 4 Drawing Figures

PATENTED SEP 19 1972　　　　　　　　　　　　　　　　　　　3,692,922

INVENTORS
YOICHI SUGIMOTO
SHIZUHIRO NAKATA
ATSUO NAKASHIMA
SOUZO IDOMOTO

BY Sughrue, Rothwell, Mion,
Zinn & Macpeak
ATTORNEYS

//3,692,922//

CABLE JOINT WITH HIGH VOLTAGE STRESS RELIEF

This application is a continuation-in-part of an application identically entitled filed July 31, 1969, under U.S. Ser. No. 846,517, now abandoned.

BACKGROUND OF THE INVENTION

1. Field Of The Invention

This invention relates to a cable joint in which the same premolded insulation sleeve can be used irrespective of the outer diameter of the cables being joined.

2. Description Of The Prior Art

With a view to the simplification of the operation, reduction in variation in results due to variation in skill and shortening of the time required for the operation, etc., in jointing rubber- or plastic-insulated cables, the so-called slip-on type joint has been developed and put to practical use in various quarters in recent times. The portion thereof heretofore made of self-bonding type winding tape is replaced by a premolded elastic insulation made into a suitable shape and containing a combination of synthetic insulating rubber having insulating and weather resistant properties and semiconductive rubber. In general, the inner diameter of the insulation sleeve is made to fit with the outer diameter of the insulating layer of the cable, so as to form an insulation reinforcement of the joint merely by inserting silicone grease or the like, which is used as a lubricant, within the same. The present invention relates to an improvement of this insertion type insulation sleeve assembly.

SUMMARY OF THE INVENTION

Theoretically, the objective of an insertion type insulation sleeve can be attained if the outer diameter of the insulating layer of the cable and the inner diameter of the premolded insulation sleeve are in close contact with each other. It is therefore necessary to provide premolded insulation sleeves of various inner diameters to fit the various sizes of cables being joined. In consequence, it is necessary to have insulation sleeves of various kinds and sizes in stock, which causes their manufacturing cost to rise as well as the price of inventory. It is the object of the present invention to remove these drawbacks and improve the workability of the cable joint.

DETAILED DESCRIPTION OF THE INVENTION

Figure 1:
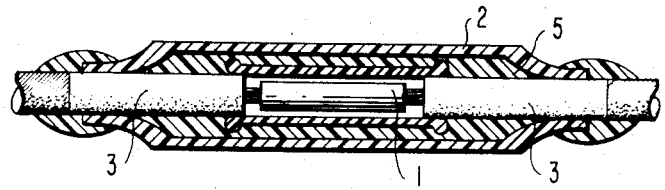
FIG. 1 is a sectional view of a prior art cable joint where an insertion type insulation sleeve of the conventional type is employed.
Figure 2:
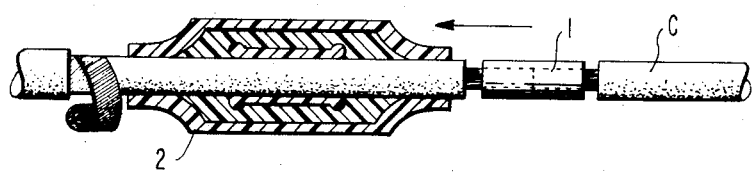
FIG. 2 illustrates the method in which the conventional insertion type insulation sleeve is installed.

The creation of a cable joint is described with reference to linear joints for example. As shown in FIG. 1, the premolded insulation sleeve 2 of the prior art constitutes an integrated cylinder having insulating interfaces closely bonded to the insulation of both cables with the conductor joint 1 lying at the center thereof. As a result, it is necessary to have the premolded insulation sleeve 2 placed around either one of the cables when the conductors are joined together. In addition, also in this instance, it is necessary to strip off the outer conductive layer of the cable and the shielding tape 7 or sheath outside of the cable insulation 3 for a length long enough to shift the premolded insulation far enough to one side or the other to make the connection between conductors of the cable possible, as evidenced in FIG. 2. In FIG. 2, sleeve 2 is moved to the left of the metal conductor joint.

After the conductors are joined together and after the premolded insulation sleeve 2 is returned to the proper position, as shown in FIG. 1, an additional job of repairing the previously stripped outer conductive layer, shielding tape or sheath is required.

The object of this invention is to eliminate the aforementioned two drawbacks, namely that (a) it is necessary to have many kinds of premolded insulation sleeves in stock and that (b) when jointing, it is necessary to remove the outer conductive layer, shielding tape or sheath.

Figure 3:
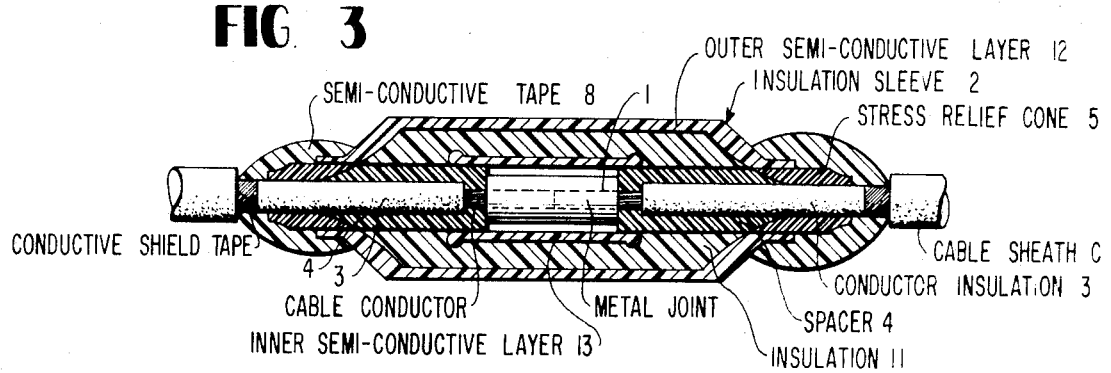
FIG. 3 is a view showing a cable joint of the present invention.
Figure 4:
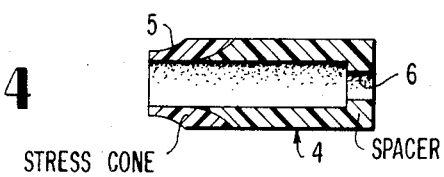
FIG. 4 is a sectional view of the insulation spacer forming a part of the cable joint of the present invention.

The preferred embodiment of the present invention is shown in FIGS. 3 and 4 and will now be explained in detail.

In FIG. 3, and in FIGS. 1 and 2, like parts are denoted by like numerals. The inner diameter of the premolded insulation sleeve 2 is made larger than the outer diameter of the sheath, and an insulating spacer in the form of a cylinder 4 is inserted in the gap created because of the difference between the diameter of the insulation layer 3 of the cable and the inner diameter of the insulation sleeve. As shown in FIG. 4, this spacer 4, made of the same material as the premolded insulation sleeve 2, includes a stress cone 5 for the purpose of reducing the electrical field at the cable shielding end with the stress cone 5 being molded along with the spacer in unitary fashion, that is, in one piece, with the cone lying at the end of the spacer and has an aperture 6 at the other end which fits to the outer diameter of the conductors being coupled by the metallic joint forming member 1.

The composite, unitary structure of premolded insulation sleeve 2 consists of outer semi-conductive layer 12 arranged outside of rubber or plastic insulation 11 in one body, with inner semi-conductive layer 13 arranged at the center and inside thereof. That is, premolded insulation sleeve 2 is formed by having 11, 12 and 13 in one body.

According to the present invention, the inner diameter of the premolded insulation sleeve 2 is larger than the outer diameter of the sheath so that it is not necessary to strip off the outer conductive layer, shielding tape, sheath, etc., for a considerable length as previously mentioned. It is therefore easy to obtain lengths necessary for jointing the conductors.

Thus, the length of these layers which are stripped off is reduced to the absolute minimum and the overall job becomes simple. It is not necessary to make repairs, the operation is completed in a short time, and the actual dimensions of the joint are reduced.

Due to the fact that the electrode construction is complicated, premolded insulations involve a high cost per unit. A considerable reduction in cost can be attained by making a large quantity of the premolded insulation sleeves to one and the same dimensions. The fitting of the outer diameter is made possible merely by changing the comparatively small and inexpensive premolded insulating spacer 4, with the resulting advantage that the main body of the insulation can be made size-free.

Spacer 4 has an internal annular projection portion, and said annular projection portion is narrow and acts as a stop between the end of cable insulation and the metallic joint forming member, and if premolded insulation sleeve 4 moves, the spacer does not move but is fixed.

Although one embodiment in the formation of a linear joint has been explained, the present invention is applicable also to the branching of cables, terminating and termination in direct connection with a machine or appliance.

As noted in FIG. 3, the means for effectively completing an electrical circuit from the stress cone 5 to the conductor shielding tape 7 due to the gap existing between the same comprises bridging the gap by wrapping a semi-conductive tape 8 about the end of the insulation sleeve 2, the underlying spacer 4, the surface portion of insulator 3, between the stress cone 5 carried by each spacer and the conductor shielding tape 7, the wrapped tape taking the form of an irregular annular shield.

As evidenced in FIG. 2, the shielded cable may consist of wire conductors, conductor or cable insulation 3 and an outer metallic shield which, as evidenced in FIG. 2, is formed at least partially of a wrapped conductive tape 7.

What is claimed is:

1. A cable joint comprising:
    shielded cables having joined conductors and exposed conductor insulation extending some distance outwardly from the conductor joint for respective cable ends,
    a premolded sleeve having an inner diameter greater than that of the cable sheath and overlying exposed insulation areas and said conductor joint, said sleeve including inner and outer concentric tubular portions, said outer tubular portion being formed of semi-conductive material, said inner tubular portion being formed of electrical insulating material and terminating in frustoconical end walls tapering respectively away from said conductor joint, said outer tubular portion extending at respective ends beyond the end wall of said inner tubular portion,
    an insulation spacer at each end of said premolded sleeve concentrically positioned between the exposed insulation and said sleeve and having an outer diameter corresponding to the inner diameter of said sleeve and an inner diameter corresponding to the outer diameter of said cable insultation,
    a stress cone formed on the end of each spacer in the area of cable insertion within said premolded sleeve, said stress cones forming frustoconical interfaces with respective spacers, being in electrical contact with the ends of said sleeve outer tubular portion extending beyond said inner tubular portion and being aligned with the inner face formed between the frustoconical end wall of said inner tubular portion, and
    means electrically connecting said stress cone to said cable shielding material.

2. The cable joint as claimed in claim 1, wherein said stress cone is spaced axially from the end of said cable shielding material, and said means electrically connecting said stress cone to said cable shield material comprises semi-conductive material surrounding said cable insulation and bridging said cable shield material and said stress cone.

3. The cable joint as claimed in claim 2, wherein said semi-conductive material bridging said stress cone and said cable shield material comprises semi-conductive tape.

4. The cable joint as claimed in claim 3, wherein the cable insulation is removed in the area of the cable conductor joint and each insulating spacer comprises a cylinder which includes an internal annular projection portion at the end facing the conductor joint which defines an opening receiving a respective cable conductor, the diameter of said opening being less than the outer diameter of the cable insulation but equal to or larger than that of the cable conductor for locating the same axially with respect to the insulated cable carrying the same.

5. The cable joint as claimed in claim 2, wherein the cable insulation is removed in the area of the cable conductor joint and each insulating spacer comprises a cylinder which includes an internal annular projection portion at the end facing the conductor joint which defines an opening receiving a respective cable conductor, the diameter of said opening being less than the outer diameter of the cable insulation but equal to or larger than that of the cable conductor for locating the same axially with respect to the insulated cable carrying the same.

6. The cable joint as claimed in claim 1, wherein the cable insulation is removed in the area of the cable conductor joint and each insulating spacer comprises a cylinder which includes an internal annular projection portion at the end facing the conductor joint which defines an opening receiving a respective cable conductor, the diameter of said opening being less than the outer diameter of the cable insulation but equal to or larger than that of the cable conductor for locating the same axially with respect to the insulated cable carrying the same.

* * * * *